United States Patent [19]

Abdalla

[11] Patent Number: 5,580,253
[45] Date of Patent: Dec. 3, 1996

[54] GEOGRAPHICAL GLOBE WITH AN INFORMATION BASE

[76] Inventor: Shakshouki Abdalla, 897 Martindale Road, Apt. 1, Sudbury, Ontario, Canada, P3E-4H9

[21] Appl. No.: 383,938

[22] Filed: Feb. 6, 1995

[51] Int. Cl.$^6$ ................................................ G09B 27/08
[52] U.S. Cl. ........................ 434/132; 434/131; 312/313; 312/315; 312/294
[58] Field of Search ........................... 434/130, 131, 434/132, 133; 312/9.1, 123, 136, 194, 195, 197, 234, 313, 315, 321.5, 294

[56] References Cited

U.S. PATENT DOCUMENTS

| 387,957 | 8/1888 | Moreon et al. | |
|---|---|---|---|
| 600,234 | 3/1898 | Parr | 434/131 |
| 1,428,957 | 9/1922 | Hall | 312/315 |
| 3,191,320 | 6/1965 | Copeland et al. | 312/313 |
| 3,281,961 | 11/1966 | Tiddens | |
| 3,374,560 | 3/1968 | Forsyth | 35/46 |
| 4,334,867 | 6/1982 | Friedman | 434/145 |
| 4,494,935 | 1/1985 | Miller | 434/132 |
| 4,609,359 | 9/1986 | Erickson et al. | 434/338 |
| 5,080,591 | 1/1992 | Forsyth | 434/147 |

OTHER PUBLICATIONS

"The Atlas" (Product No. 86–7097); *Rand McNally '69–70 Globe Catelog;* Rand McNally and Company; Chicago, IL, Item R, p. 4; Received at New York Toy Fair, Mar. 2–3, 1970.

*Primary Examiner*—Gene Mancene
*Assistant Examiner*—Jeffrey A. Smith
*Attorney, Agent, or Firm*—Richard L. Miller, P.E.

[57] ABSTRACT

A geographical globe to provide geographical data about all of the continents so that a person can learn about those particular continents of interest. The geographical globe with an information base comprises an orb-shaped model assembly of the earth. A base member supports the orb-shaped model assembly. A structure in the base member supplies data about different countries on each continent of the earth.

1 Claim, 1 Drawing Sheet

U.S. Patent	Dec. 3, 1996	5,580,253
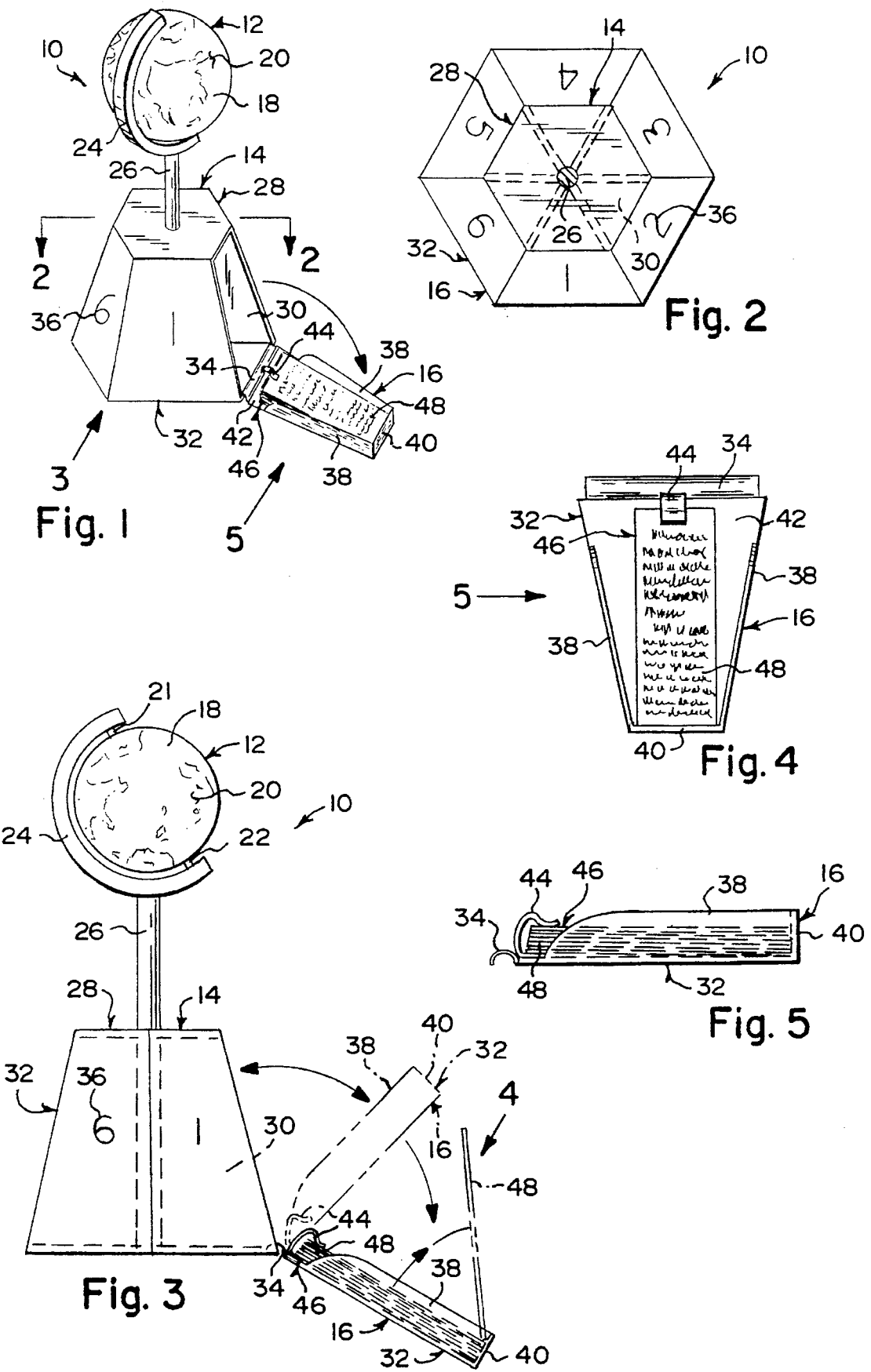

5,580,253

GEOGRAPHICAL GLOBE WITH AN INFORMATION BASE

BACKGROUND OF THE INVENTION

The instant invention relates generally to geography teaching aids and more specifically it relates to a geographical globe with an information base.

Numerous geography teaching aids have been provided in prior art that are adapted to teach people where various places are on a map or on a globe of the world. For example, U.S. Pat. Nos. 3,374,560 to Forsyth; 4,334,867 to Friedman; 4,609,359 to Erickson et al. and 5,080,591 to Forsyth all are illustrative of such prior art. While these units may be suitable for the particular purpose to which they address, they would not be as suitable for the purposes of the present invention as heretofore described.

SUMMARY OF THE INVENTION

A primary object of the present invention is to provide a geographical globe with an information base that will overcome the shortcomings of the prior art devices.

Another object is to provide a geographical globe with an information base, in which the base will contain multiple compartments and each compartment will retain information about one particular continent, so that a person can learn about the continents.

An additional object is to provide a geographical globe with an information base, in which each compartment in the base will include a hinged door which folds downwardly therefrom, containing alphabetical information cards that have data about all of the countries in that particular continent.

A further object is to provide a geographical globe with an information base that is simple and easy to use.

A still further object is to provide a geographical globe with an information base that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a diagrammatic perspective view of the instant invention;

FIG. 2 is an enlarged cross sectional view taken on line 2—2 in FIG. 1;

FIG. 3 is an enlarged diagrammatic elevational view taken in the direction of arrow 3 in FIG. 1;

FIG. 4 is an enlarged plan view taken in the direction of arrow 4 in FIG. 3; and FIG. 5 is an enlarged side elevational view taken in the direction of arrow 5 in FIGS. 1 and 4.

DETAILED DESCRIPTION OF THE PREFERRED EMBODIMENTS

Turning now descriptively to the drawings, in which similar reference characters denote similar elements throughout the several views, FIGS. 1 through 5 illustrate a geographical globe with an information base 10 comprising an orb-shaped model assembly 12 of the earth. A base member 14 is to support the orb-shaped model assembly 12. A structure 16 in the base member 14, is for supplying data about different countries on each continent of the earth.

The orb-shaped model assembly 12 of the earth includes a sphere 18 having a relief shading key 20 thereon representing the water and different countries on each continent of the earth. A first pin 21 extends from a north pole location on the sphere 18. A second pin 22 extends from a south pole location on the sphere 18. A meridian member 24 is for pivotally mounting the first pin 21 and the second pin 22 thereto, so that the sphere 18 can spin about. A stanchion 26 is for supporting the meridian member 24. The stanchion 26 extends upwardly from the base member 14.

The base member 14 is a frustum hexagonal pyramid shaped housing 28, having six compartments 30 for storing small articles therein. Six doors 32 are for covering the six compartments 30 in the housing 28. Six hinges 34 are provided. Each hinge 34 is located between a bottom outer edge of each compartment 30 in the housing 28 and a bottom edge of each door 32. Each door 32 can be flipped outwardly and downwardly from the housing 28.

The data supplying structure consists of each door 32 having indicia 36 thereon to indicate a continent. Each door 32 has a pair of inner low side walls 38 and an inner low top wall 40, for form an inner tray 42 therein. An inner spring clip 44 is located at the bottom edge of each door 32 adjacent the hinge 34. Six sets of cards 46 are provided. Each card 48 in each set of cards 46 has information about one particular country located on a respective continent of the earth. Each set of cards 46 are held by each spring clip 44 in each inner tray 42 on each matching door 32, to be reviewed by a person when the need arises.

The indicia 36 on each door 32, as shown in the drawings, are numbers "1" through "6". For example, number "1" can represent Asia, "2" Africa, "3" North America, "4" South America, "5" Europe and "6" Australia. The indicia can actually be the word names of the above continents. Behind each door 32 are the countries for each respective continent.

OPERATION OF THE INVENTION

To use the geographical globe with an information base 10, a person simply picks out one particular country located on one particular continent from the sphere 18. Next, open the door 32 that represents the continent in which that country is located on. Remove the card 48 from its set of cards 46 from the inner tray 42 and rear the information on that card 48 about that country. Inside the compartment 30 behind the door 32 are stored small articles, such as pens, pencils, writing paper and similar items.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A geographical globe with an information base comprising:

a) an orb-shaped model assembly of the earth, said orb-shaped model assembly of the earth including:
  i) a sphere having a relief shading key thereon representing the water and different countries on each continent of the earth;
  ii) a first pin extending from a north pole location on said sphere;
  iii) a second pin extending from a south pole location on said sphere;
  iv) a meridian member pivotally mounted to said first pin and said second pin, so that said sphere can spin; and
  v) a stanchion supporting said meridian member and extending upwardly from said base member;
b) a base member supporting said orb-shaped model assembly, said base member including:
  i) a frustum hexagonal pyramid shaped housing having six compartments for storing small articles therein;
  ii) six doors covering said six compartments in said housing; and
  iii) six hinges, each said hinge being located between a bottom outer edge of each said compartment in said housing and a bottom edge of each said door, so that each said door can be flipped outwardly and downwardly from said housing; and
c) data supplying means in said base member for supplying data about different countries on each continent of the earth, said data supplying means including:
  i) each said door having indicia thereon indicating a continent;
  ii) each said door having a pair of inner low side walls and an inner low top wall forming an inner tray therein;
  iii) an inner spring clip located at said bottom edge of each said door adjacent said hinge; and
  iv) six sets of cards, each card in each said set of cards having information about one particular country located on a respective continent of the earth, each said set of cards being held by each said spring clip in each said inner tray on each said matching door so as to be reviewed by a person when the need arises.

* * * * *